United States Patent [19]

Opitz et al.

[11] Patent Number: 4,641,137
[45] Date of Patent: Feb. 3, 1987

[54] RADAR APPARATUS FOR DETERMINING RANGE TO AN AGITATED REFLECTIVE TARGET

[75] Inventors: Charles L. Opitz, Lancaster, Pa.;
Paul E. Chase, Kendall Park, N.J.

[73] Assignee: Lockheed Electronics Co., Inc., Plainfield, N.J.

[21] Appl. No.: 629,211

[22] Filed: Nov. 6, 1975

[51] Int. Cl.[4] .......................... G01S 13/00; G01S 13/52
[52] U.S. Cl. ........................................... 342/52; 342/5;
342/104; 342/73; 342/61
[58] Field of Search ................. 343/5 SA, 5 PD, 6 R, 343/7.7, 8, 7 A; 340/16 R

[56] References Cited

U.S. PATENT DOCUMENTS

| | | | |
|---|---|---|---|
| 684,706 | 10/1901 | Mundy | 340/16 R |
| 2,910,665 | 10/1959 | Hawkins | 340/16 R |
| 3,512,155 | 5/1970 | Bloice | 343/8 |
| 3,713,149 | 1/1973 | Bruner et al. | 343/7 A |
| 3,733,603 | 5/1973 | Johnston | 343/7.7 |
| 3,882,495 | 5/1975 | Bolger | 343/5 SA |

*Primary Examiner*—S. C. Buczinski
*Attorney, Agent, or Firm*—Hopgood, Calimafde, Kalil, Blaustein & Judlowe

[57] ABSTRACT

Improved non-cooperative radar apparatus locates and type-classifies an agitated, vibrating reflective target (e.g., a vehicle with its engine running) - whether the target is moving or stationary.

A homodyne-type receiver with a cooperating band pass filter extracts a reflected, frequency-shifted energy pattern which identifies the incidence of the agitated target. In accordance with further aspects of the instant invention, the particular energy distribution for the returned, reflected wave is then compared with a stored ensemble of such distributions, or target "signatures", to type-catagorize the target.

2 Claims, 3 Drawing Figures

RADAR APPARATUS FOR DETERMINING RANGE TO AN AGITATED REFLECTIVE TARGET

DISCLOSURE OF THE INVENTION

This invention relates to non-cooperative radar object-locating surveillance systems and, more specifically, to novel radar apparatus for locating and type-characterizing a target formed of plural "agitated" components.

Prior art non-cooperative radar systems have operated in several modes to detect and locate a target. As a generality, such systems radiate pulsed or continuous energy, and identify a target by examining some property of the return signal reflected from the target, e.g., amplitude, frequency (for Doppler systems generating a frequency change dependent upon the relative motion between the radar apparatus and target), or phase.

However, it has been found difficult with such prior art radar systems to (1) detect a stationary target in an object filled ("cluttered") environment—e.g., a stationary vehicle in a forest; or (2) to identify the type of target which is giving rise to a positive return signal.

It is an object of the present invention to provide improved radar apparatus.

More specifically, it is an object of the present invention to provide novel radar apparatus for detecting targets formed of plural vibrating components (e.g., a vehicle with its engine running)—even if the target is stationary, thus rendering a Doppler radar ineffective.

It is a further object of the present invention to provide radar apparatus which provides type-identification of an agitated or vibrating multipart reflective target.

Yet another object of the present invention is the provision of field radar apparatus for locating agitated reflective objects which also produce an audible noise transient, such as a fixed artillery piece.

The above and other objects of the present invention are realized in specific, illustrative radar apparatus for locating and, if desired, identifying a target characterized by switching, or agitated reflective components. The non-cooperative target locating and identifying apparatus is operative upon the principle that such vibrating target structures produce a unique reflected energy pattern (herein: "signature") of energy in a band slightly displaced from the radiated search wave—e.g., by about 2 khz.

In accordance with the principles of the present invention, the agitated-target detecting radar receiver apparatus is supplied with a very accurate measure of the outgoing radiated wave frequency, employing this for heterodyne (homodyne) conversion of the received target-reflected signal to base band. A band pass filter then extracts the target signature wave in a frequency band slightly displaced (in relative terms) from the radiated signal (frequency zero at base band). Pursuant to varying aspects of the instant invention, the reflected, signature-return signal may be employed per se to simply indicate target presence, range and azimuth, or may be compared with known, pre-stored signature patterns to classify the particular target encountered.

The above and other features and advantages of the present invention will become more clear from the description hereinbelow in conjunction with specific illustrative radar systems for detecting switching, or agitated reflective targets, in which.

Figure 1:
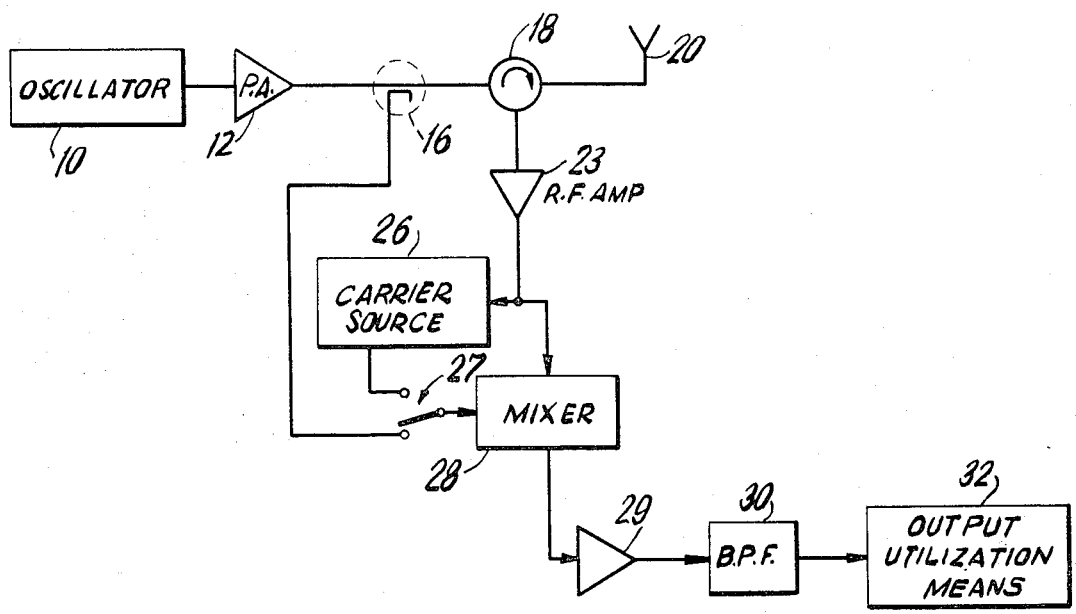
FIG. 1 is a basic block diagram of improved radar apparatus embodying the principles of the present invention.

Referring now to FIG. 1, there is shown in basic block diagram form improved, illustrative, non-cooperative radar apparatus for locating and, if desired, classifying by type an agitated, reflective target. The FIG. 1 radar is operative to yield target information whether the target is stationary or moving, requiring only that the target include a plurality of components which are vibrating or agitated, i.e., have an array of parts which are undergoing relative translation. The device is operative utilizing the principle that such a vibrating or agitated target will generate a substantially band limited return signal which is displaced in frequency from the radiated search wave by a predetermined, and relatively small, substantially fixed amount.

Thus we have found that a frequency band beginning at a frequency slightly greater than the emitted frequency (relative frequency zero after homodyne detection) and ranging up to 2 khz to be effective for the direction of an agitated target—even at frequencies in the X band range. Moreover, it has been determined further that the particular distribution of energy in this $0 \leq f \leq 2$ khz (relative to the transmitted wave) differs with differing kinds of targets. Thus, a positive reflected energy return in this spectrum may be examined, and comprises a form of "signature" which may be employed to identify the type of target. Accordingly, as more fully described below, the return signal may be compared with stored forms of signature distributions for varying kinds of targets to characterize the particular target encountered.

With the above principles in mind, and returning to FIG. 1, there is shown specific illustrative apparatus for effecting the above described improved radar functioning, i.e., for fully determining the incidence and type of such an agitated or vibrating target. The arrangement includes an oscillator 10 which supplies a transmitted search beam sinusoid on either a continuous wave or pulse basis acting through a power amplifier 12, a directional coupler 16, a circulator 18 and antenna 20.

Return signals produced responsive to the transmitted wave are received in the antenna 20, and pass via the circulator 16 and a radio frequency amplifier 22 to a mixer 28. In the presentation in conjunction with FIG. 1, the use of a single antenna 20 employed for both the transmit and receive functions in conjunction with a circulator 18 or a transmit-receive switch is disclosed. It will be appreciated by those skilled in the art that any form of integrated or separate transmit-receive radar apparatus might as well have been employed.

As above described, the determination of an agitated target is made by examining a band of energy very close in frequency to the emitted wave, but separated therefrom to reject all background clutter and simple "skin" reflections for inert reflective bodies. To this end, and recognizing the widely disparate frequency value of a typical X band transmission vis-a-vis the 0–2 kHz band desired for isolation, the mixer 28 is employed in a homodyne mode of reception, i.e., where the return, reflected signal is mixed or beat with a signal which provides a very accurate direct measure of the radiated wave frequency (typically equal thereto). As shown in FIG. 1, this may be effected by employing a directional coupler 16 to identically provide a portion of the radiated wave to the mixer 28. Alternatively, circuitry 26 can be used to regenerate the carrier from the receive signal in any manner well known to those skilled in the art, e.g., by employing a narrow band phase locked loop and, in the case of a pulsed search beam, employing a storage element (e.g., a capacitor) to preserve the radiated carrier or the Doppler shifter carrier frequency (for a moving platform) from the previous pulse cycle. While a transfer switch 27 is schematically shown in FIG. 1 to select between mixing oscillations, typical radar apparatus will employ only one source of the radiated wave for homodyne detection, e.g., a portion of the outgoing wave as via a directional coupler 16 or other tap, or the circuitry 26.

The output of the mixer 28, which is base band in the case of a beat signal equal in frequency to the emitted carrier wave is amplified in an amplifier 29 and supplied to a band pass filter 30, it obviously being possible to combine the functions of the amplifier 29 and filter 30. The pass band of the filter 30 is adapted to yield the band limited frequency range of interest for switched or agitated target detection, for example, the range somewhat greater than the radiated wave (zero relative frequency) to about 2 kHz above the radiated wave as above discussed. Finally, the output of the band pass filter is supplied to a form of output utilization means 32.

In its simplest form, the output utilization means may simply comprise a threshold circuit for providing an output, target indicating signal when the gross energy content of the band limited frequency range of interest supplied exceeds a minimum threshold level, signalling that an agitated target of some form has been encountered. This positive energy return may then be used in any manner well known to those skilled in the radar art. Thus, for example, target location may be achieved by measuring the delay period between a radiated search pulse and a positive return signal detected by the output utilization means 32, the azimuth between the radar apparatus and target corresponding to the radial direction of the emitted wave which produced the return. Again, as well known to those skilled in the art, such azimuth information may be signalled by the angular position of the antenna 20 during the target-producing cycle in the case of a rotating antenna, or effective angular position in the case of scanning by a phased array. See also Lockheed Electronics Co. Pat. No. 3,900,846 for more accurately determining azimuth by examining repeated returns for a rotating antenna.

Figure 2:
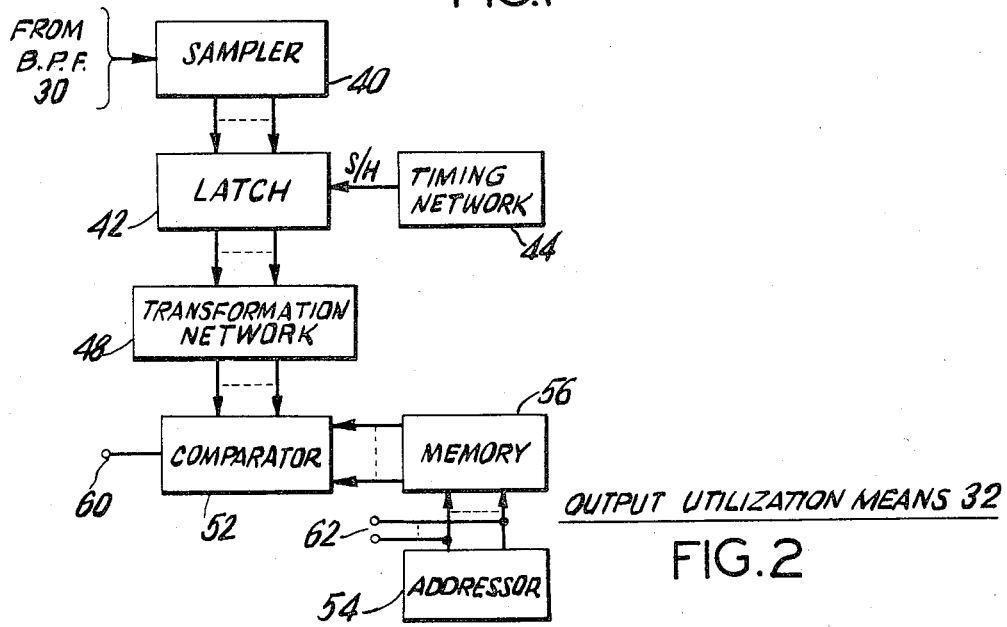
FIG. 2 is a specific illustrative form of output utilization means 32 of FIG. 1 for classifying positive target returns from vibrating, reflective, multi-component targets.
Figure 3:
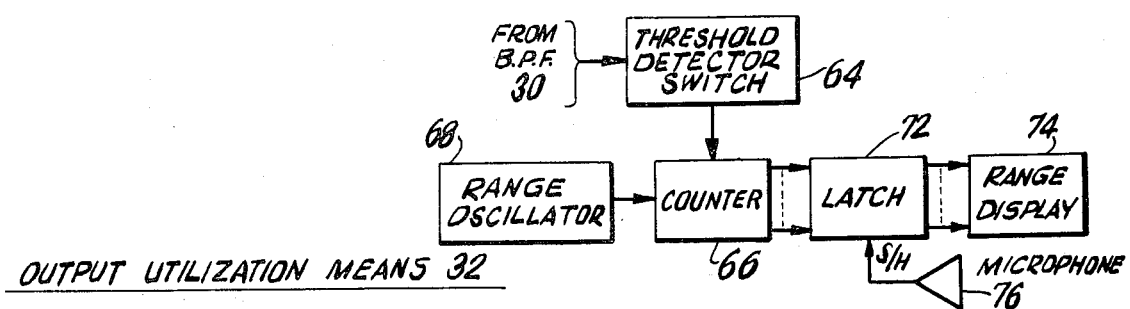
FIG. 3 is a further illustrative form of output utilization means 32 which may be employed in the composite FIG. 1 arrangement.

Particular forms of output utilization means 32 are illustrated in FIGS. 2 and 3 which will now be considered in turn. Examining first the arrangement of FIG. 2, there is shown structure for determining the type of target encountered in the manner above described, viz., by examining the particular form and energy distribution content of the return signal. To this end, the return wave is supplied to a sampling circuit 40 which quantizes the incoming signal into binary form, providing a plural digit representation of the received reflecting target return to a store, or latch 42 under control of a timing network 44. At this point, then, the output of the latch presents (for as long as is required) a binary representation of the return signal. This signal representation may simply be compared with an array of stored representations of known types of target signatures or patterns. If a substantial match is determined between the instant return and one of the stored patterns, the type of target thus identified, i.e., corresponding to the stored signature giving rise to the match, is identified.

However, in accordance with one aspect of the instant invention, it has been found preferable to effect a transformation of the latch 42 time domain output signals for "match" determination in accordance with recognized match transforms, e.g., the per se well known Hadamard transform or the Fourier transform, to render the target type-classification process time-independent. Of course, the stored known signature patterns are also stored in like transformed form. A transformation network 49 is thus employed, and comprises linear arithmetic circuitry well known to those skilled in the art for generating at each network output $O_i$ a summation of various (or all) of the inputs $I_j$ thereto multiplied by constants. Thus, for example for the Hadamard transform, the relationship may be expressed by the matrix relationship $$[I_1, I_2, I_3, I_4] \begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} O_1 \\ O_2 \\ O_3 \\ O_4 \end{bmatrix}, \text{[four point matrix]}.$$

Where the Hadamard transform is effected by the network 48, a memory 56 stores Hadamard transformed versions of known target type returns, and a comparator 52 employed to signal when a match is achieved. More specifically, an address unit 54 causes the memory 56 to sequentially read out the ensemble of transformed return signal types to the comparator 52 which receives as a fixed input from the output of the transformation network 48. When a substantial match is achieved, the comparator 52 energizes an output lead 60 signalling such an occurrence. The type of match is dependent upon the contents of the memory cell then being read out, i.e., which generated the match, and this may be derived from the addressing unit 54 (e.g., via leads 62).

Similarly, where a Fourier transformation is utilized, the network effects the arithmetic operations (assuming four points):

$$[I_1, I_2, I_3, I_4] \begin{bmatrix} 1 & 1 & 1 & 1 \\ 1 & e^{-(i\pi/2)} & e^{-i\pi} & e^{-(i3\pi/2)} \\ 1 & e^{-i\pi} & e^{-i2\pi} & e^{-i3\pi} \\ 1 & e^{-(i3\pi/2)} & e^{-i3\pi} & e^{-(i9\pi/2)} \end{bmatrix} = \begin{bmatrix} O_1 \\ O_2 \\ O_3 \\ O_4 \end{bmatrix}$$

It will be appreciated by those skilled in the art that the comparator 52 may be employed to determine a match on any basis known to those skilled in the art, i.e., on the basis of the Schwartz inequality wherein $$\frac{\epsilon^2(O_j B_j)}{\epsilon(O_j)^2 \epsilon(B_j)^2} \geq K,$$

wherein the $O_j$ and $B_j$ are inputs supplied to the comparator by the elements 48 and 56, and K is a preselected threshold level. That is, when the above computation yields a value $\geq K$, a "match" is recognized, and the target is deemed classified.

The composite arrangements of FIGS. 1 and 2 have thus been shown by the above to detect the incidence of a target having agitated metallic components or the like; to locate such a target; and, moreover, to classify the target as to type.

A further illustrative radar system using the basic FIG. 1 vibrating target signalling radar apparatus is disclosed employing the FIG. 3 circuitry for the output utilization means 32 of FIG. 1. The basic function of such combined apparatus is to provide a relatively inexpensive field type radar unit adapted to locate an agitated target which emits an audible noise, e.g., a fired artillery piece. When fired, the agitated gun components produce a frequency shifted radar return in the manner above stated giving rise to an output from the band pass filter 30 which is detected on an integrated, energy threshold basis by a threshold detecting switch 64. The detector 64 thus provides an output signal to clear, or gate on a counter 66 essentially coincident with the firing of the artillery piece. The counter 66 is then cycled by output pulses from a range oscillator 68, the period of the oscillator 68 being adapted such that each pulse corresponds to a certain distance unit.

Sometime later, a microphone 76 receives the audible report from the fired piece to load a latch or register 72 with the instantaneous contents of the counter 66. The latch 72 is thus loaded with a measure of the elapsed time consumed by the differential speed of the electronic wave—sound wave to travel the distance from the fired piece to the radar equipment—which largely equates with the sound travel duration, since sound travels much more slowly than the reflected radar signal. Thus, in addition to representing a measure of elapsed time, and assuming the speed of sound to be constant or else corrected for local environmental conditions as by a slight period correction for the oscillator 68, the latch 72 contains a measure of the distance between the radar equipment and the fired artillery piece or the like. Thus, the presumably unfriendly artillery piece is then located in azimuth by the direction of the radar beam which produced the positive reflected return and located in distance by the output of the latch 72 which may be converted to an analog or digital range display by circuitry 74 if desired.

Again, the above described arrangements have been shown to functionally provide radar apparatus for locating and classifying agitated reflective bodies. The structure is operative whether the non-cooperative target is moving or stationary relative to the radar apparatus. Indeed, the agitated target locating technology above described may be employed in conjunction with a Doppler radar such as employed in a flying aircraft by simply using the band pass filter 30 to extract the frequency shifted band produced by the agitated metal components in a band not at the radiated scan frequency, but at a frequency displaced therefrom by an amount represented by the Doppler shift between the relatively translating radar and target.

The above described apparatus and methodology is merely illustrative of the principles of the present invention. Numerous modifications and adaptations thereof will be readily apparent to those skilled in the art without departing from the spirit and scope of the present invention.

What is claimed is:

1. In combination in radar apparatus for detecting an agitated, reflective target comprising means for radiating an interrogation wave of radio frequency energy, means for receiving any reflected energy signal, mixing means for mixing said reflected signal with a local oscillation comprising a replica of the frequency of said radiated wave, band pass filter means connected to said mixing means for extracting from the output of said mixing means a band limited portion of said reflected signal in a fixed, predetermined frequency band adjacent to but not including the frequency after mixing of said radiated wave, and output utilization means connected to the output of said band pass filter means, wherein said output utilization means comprises elapsed time measuring means, means responsive to said extracted band limited signal from the output of said band pass filter means signalling the incidence of an agitated target for enabling said elapsed time measuring means, and means for deriving a measure of the signal generated by said elapsed time measuring means, wherein said elapsed time signal deriving means comprises audible responsive means responsive to an audible emission from the target for producing an output signal, and means responsive to said output signal from said audible responsive means for obtaining said measure of said signal provided by said elapsed time measuring means.

2. A combination as in claim 1 wherein said elapsed time measuring means comprises a counter and an oscillator cyclically advancing said counter.

* * * * *